United States Patent
Huang et al.

(10) Patent No.: US 11,039,330 B2
(45) Date of Patent: Jun. 15, 2021

(54) METHOD OF MEASUREMENT GAP ENHANCEMENT

(71) Applicant: APPLE INC., Cupertino, CA (US)

(72) Inventors: Rui Huang, Beijing (CN); Yang Tang, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/743,915

(22) PCT Filed: Feb. 27, 2016

(86) PCT No.: PCT/US2016/019984
§ 371 (c)(1),
(2) Date: Jan. 11, 2018

(87) PCT Pub. No.: WO2017/027066
PCT Pub. Date: Feb. 16, 2017

(65) Prior Publication Data
US 2018/0213425 A1    Jul. 26, 2018

Related U.S. Application Data

(60) Provisional application No. 62/204,383, filed on Aug. 12, 2015.

(51) Int. Cl.
*H04W 24/10* (2009.01)
*H04W 76/20* (2018.01)
(Continued)

(52) U.S. Cl.
CPC ....... *H04W 24/10* (2013.01); *H04W 36/0094* (2013.01); *H04W 76/20* (2018.02);
(Continued)

(58) Field of Classification Search
None
See application file for complete search history.

(56) References Cited

U.S. PATENT DOCUMENTS

| 8,374,600 B2 * | 2/2013 | Lindstrom | H04W 24/10 455/425 |
| 8,509,783 B2 * | 8/2013 | Iwamura | H04W 24/10 455/438 |

(Continued)

FOREIGN PATENT DOCUMENTS

| WO | WO2012146274 | * 11/2012 | ............ H04W 24/10 |
| WO | 2015023222 A1 | 2/2015 | |

OTHER PUBLICATIONS

International Search Report (dated May 4, 2016) and Written Opinion, International App. No. PCT/US2016/019984, 16 pages.
(Continued)

*Primary Examiner* — Gregory B Sefcheck
(74) *Attorney, Agent, or Firm* — Eschweiler & Potashnik, LLC

(57) ABSTRACT

A measurement gap enhancement method is disclosed for use in both synchronous and asynchronous networks. The measurement gap enhancement method employs a first measurement gap pattern, suitable for synchronous networks, including measurement gaps that are of shorter duration and available for more frequency measurements than in legacy implementations. The measurement gap enhancement method also employs a second measurement gap pattern, which also includes short duration measurement gaps, but is also characterized by flexible measurement gap repetition periods suited to asynchronous networks. The first and second measurement gap patterns are made known to an user equipment by way of novel information elements used during RRC connection reconfiguration by the enhanced NodeB base station. The measurement gap enhancement method enables the user equipment to maintain its radio frequency setting between measurements, particularly automatic gain control.

24 Claims, 11 Drawing Sheets

(51) Int. Cl.
*H04W 52/02* (2009.01)
*H04W 36/00* (2009.01)

(52) U.S. Cl.
CPC .... *H04W 36/0088* (2013.01); *H04W 52/0216* (2013.01); *Y02D 30/70* (2020.08)

(56) References Cited

U.S. PATENT DOCUMENTS

| | | | | |
|---|---|---|---|---|
| 8,588,800 | B2* | 11/2013 | Iwamura | H04W 72/085 |
| | | | | 455/452.1 |
| 8,842,564 | B2* | 9/2014 | Kazmi | H04W 24/10 |
| | | | | 370/252 |
| 8,965,414 | B2* | 2/2015 | Siomina | H04W 24/10 |
| | | | | 455/456.6 |
| 9,002,354 | B2* | 4/2015 | Krishnamurthy | G01S 1/30 |
| | | | | 455/435.1 |
| 9,319,985 | B2* | 4/2016 | Vangala | H04W 36/0085 |
| 9,392,512 | B2* | 7/2016 | Su | H04W 36/0085 |
| 9,408,103 | B2* | 8/2016 | Bai | H04W 24/10 |
| 9,414,349 | B2* | 8/2016 | Siomina | H04W 24/10 |
| 9,485,683 | B2* | 11/2016 | Chincholi | H04W 24/10 |
| 9,515,771 | B2* | 12/2016 | Venkob | H04W 52/0216 |
| 9,634,820 | B2* | 4/2017 | Kazmi | H04W 72/1289 |
| 9,775,063 | B2* | 9/2017 | Siomina | G01S 5/0205 |
| 9,955,375 | B2* | 4/2018 | Chincholi | H04W 24/10 |
| 10,091,681 | B2* | 10/2018 | Mager | H04W 24/10 |
| 10,103,867 | B2* | 10/2018 | Da | H04L 7/0037 |
| 10,111,122 | B2* | 10/2018 | Chincholi | H04W 16/14 |
| 10,243,704 | B2* | 3/2019 | Yiu | H04L 5/001 |
| 10,244,441 | B2* | 3/2019 | Huang | H04W 36/0088 |
| 2008/0189970 | A1 | 8/2008 | Wang | H04W 36/0055 |
| | | | | 33/701 |
| 2009/0325580 | A1* | 12/2009 | Kazmi | H04W 24/10 |
| | | | | 455/436 |
| 2012/0115463 | A1* | 5/2012 | Weng | H04L 1/0026 |
| | | | | 455/425 |
| 2013/0059610 | A1* | 3/2013 | Siomina | H04W 24/10 |
| | | | | 455/456.6 |
| 2013/0107742 | A1* | 5/2013 | Ishii | H04L 5/001 |
| | | | | 370/252 |
| 2013/0242796 | A1* | 9/2013 | Chen | H04L 5/001 |
| | | | | 370/252 |
| 2013/0272255 | A1* | 10/2013 | Zhu | H04B 7/0486 |
| | | | | 370/329 |
| 2015/0245235 | A1* | 8/2015 | Tang | H04W 36/0088 |
| | | | | 370/252 |
| 2015/0327097 | A1* | 11/2015 | Chai | H04W 24/08 |
| | | | | 370/252 |
| 2015/0373571 | A1* | 12/2015 | Chincholi | H04L 5/0057 |
| | | | | 370/330 |
| 2016/0157116 | A1* | 6/2016 | Zhang | H04W 48/16 |
| | | | | 370/252 |
| 2017/0064578 | A1* | 3/2017 | Takahashi | H04W 8/22 |
| 2017/0134976 | A1* | 5/2017 | Uchino | H04W 72/0453 |
| 2017/0257785 | A1* | 9/2017 | Henttonen | H04L 5/0048 |
| 2018/0077596 | A1* | 3/2018 | Huang | H04W 24/08 |
| 2018/0132124 | A1* | 5/2018 | Huang | H04W 36/0094 |

OTHER PUBLICATIONS

3rd Generation Partnership Project;Technical Specification Group Radio Access Network; Evolved Universal Terrestrial Radio Access (E-UTRA); Radio Resource Control (RRC);Protocol specification(Release 12).

3rd Generation Partnership Project; Technical Specification Group Radio Access Network; Study on measurement gap enhancement in LTE (Release 13).

Lucent, Alcatel, "Further discussion of Enhancement of measurement gap pattern" 3GPP TSG-RAN WG4 Meeting #75 R4-153001—May 25-29.

Ericsson, "Gap pattern design for offload measurements" 3GPP TSG RAN WG4 Meeting #69 R4-136032—San Francisco, USA, Nov. 11-16, 2013.

Ericsson, "Further analysis on measurement gap enhancement" 3GPP TSG-RAN WG4 Meeting # 75 R4-152848 Fukuoka, Japan, May 25-29, 2015.

Intel Corporation, "On measurement gap enhancement for Hetnet" 3GPP TSG-RAN WG4 Meeting #75 R4-153583 Fukuoka, Japan May 25-29, 2015.

* cited by examiner

Figure 7 gap pattern configurations supported by the UE (from 3GPP TS 36.331)

300

| Gap Pattern ID | MGL (ms) | MGRP (ms) | burst gap repetition period ($T_{burst}$, ms) | $T_{inter1}$ (ms) | measurement purpose |
|---|---|---|---|---|---|
| 0 | 6 | 40 | | 60 | Inter-frequency EUTRAN FDD & TDD, UTRAN FDD, GERAN, LCR TDD, HRPD, CDMA2000 1x |
| 1 | 6 | 80 | | 30 | Inter-frequency EUTRAN FDD & TDD, UTRAN FDD, GERAN, LCR TDD, HRPD, CDMA2000 1x |
| 2 | 2 | 40 | specified by RRC signaling "numberMeasCarrierOffloading" (e.g., 3) | 40 * (Ngap + 4) [note: 4 x 40ms is AGC valid duration] | |
| 3 | 2 | 80 | specified by RRC signaling "numberMeasCarrierOffloading" (e.g., 3) | 80 * (Ngap + 2) [note: 2 x 80ms is AGC valid duration] | |

Figure 8

*MeasGapConfig* information element (150)

```
--ASN1START

MeasGapConfig ::=        CHOICE {
    release                  NULL,
    setup                    SEQUENCE {
        gapOffset                CHOICE {
            gp0                      INTEGER (0 .. 39),
            gp1                      INTEGER (0 .. 79),
            gp2                      INTEGER (0 .. 39),
            gp3                      INTEGER (0 .. 79),
            ...
        numberMeasCarrierOffloading    INTEGER (0 .. 16)
    }
}
--ASN1STOP
```

Figure 9 gap pattern configurations supported by the UE (from 3GPP TS 36.331)

400

| Gap Pattern ID | MGL (ms) | MGRP (ms) | MGRP offset | number of gaps per a burst ($N_{gap}$) | BGRP (ms) | $T_{inter1}$ (ms) | measurement purpose |
|---|---|---|---|---|---|---|---|
| 0 | 6 | 40 | | | | 60 | Inter-frequency EUTRAN FDD & TDD, UTRAN FDD, GERAN, LCR TDD, HRPD, CDMA2000 1x |
| 1 | 6 | 80 | | | | 30 | Inter-frequency EUTRAN FDD & TDD, UTRAN FDD, GERAN, LCR TDD, HRPD, CDMA2000 1x |
| 2 | 2 | 40 | 0 | specified by RRC signaling "numberMeasCarrierOffloading" (e.g., 3) | 40 * ($N_{gap}$ + 4) [note: 4 x 40ms is AGC valid duration] | | |
| 3 | 2 | 80 | 0 | specified by RRC signaling "numberMeasCarrierOffloading" (e.g., 3) | 80 * ($N_{gap}$ + 2) [note: 2 x 80ms is AGC valid duration] | | |

Figure 9 (cont.)

gap pattern configurations supported by the UE (continued)

| Gap Pattern ID | MGL (ms) | MGRP (ms) | MGRP offset | number of gaps per a burst (Ngap) | BGRP (ms) | Tinter (ms) | measurement purpose |
|---|---|---|---|---|---|---|---|
| 4 | 2 | 40 | 2 | specified by RRC signaling "numberMeasCarrierOffloading" (e.g., 3) | 40 * (Ngap + 4) [note: 4 x 40ms is AGC valid duration] | 60 | Inter-frequency EUTRAN FDD & TDD, UTRAN FDD, GERAN, LCR TDD, HRPD, CDMA2000 1x |
| 5 | 2 | 80 | 2 | specified by RRC signaling "numberMeasCarrierOffloading" (e.g., 3) | 80 * (Ngap + 2) [note: 2 x 80ms is AGC valid duration] | 30 | Inter-frequency EUTRAN FDD & TDD, UTRAN FDD, GERAN, LCR TDD, HRPD, CDMA2000 1x |
| 6 | 2 | 40 | -2 | specified by RRC signaling "numberMeasCarrierOffloading" (e.g., 3) | 40 * (Ngap + 4) [note: 4 x 40ms is AGC valid duration] | | |
| 7 | 2 | 80 | -2 | specified by RRC signaling "numberMeasCarrierOffloading" (e.g., 3) | 80 * (Ngap + 2) [note: 2 x 80ms is AGC valid duration] | | |

Figure 10

*MeasGapConfig* information element (250)

```
-- ASN1START

MeasGapConfig ::=          CHOICE {
    release                    NULL,
    setup                      SEQUENCE {
        gapOffset                  CHOICE {
            gp0                        INTEGER (0..39),
            gp1                        INTEGER (0..79),
            gp2                        INTEGER (0..39),
            gp3                        INTEGER (0..79),
            gp4                        INTEGER (0..39),
            gp5                        INTEGER (0..79),
            gp6                        INTEGER (0..39),
            gp7                        INTEGER (0..79),
            ...
        },
        numberMeasCarrierOffloading    INTEGER (0..16)
    }
}

-- ASN1STOP
```

METHOD OF MEASUREMENT GAP ENHANCEMENT

CROSS REFERENCE TO RELATED APPLICATIONS

Pursuant to 35 U.S.C. § 371, this application is the United States National Stage Application of International Patent Application No. PCT/US2016/019984, filed on Feb. 27, 2016, which claims the benefit of priority under 35 U.S.C. 119(e) to U.S. Provisional Patent Application Ser. No. 62/204,383, filed on Aug. 12, 2015, which is incorporated herein by reference in its entirely.

TECHNICAL FIELD

Embodiments described herein generally relate to wireless networks. Some embodiments relate generally to inter-frequency measurements and the measurement gap of the Long Term Evolution (LTE) wireless cellular standard.

BACKGROUND

The Evolved Packet Core (EPC) is the core network of advanced mobile communication systems. The EPC allows different radio access technologies (RATs) to operate in an integrated manner. These radio access technologies include first generation wireless Local Area Networks (LANs), second generation (2G) systems, such as Global System for Mobile communication, or GSM, third generation systems, such as the Universal Mobile Telecommunication System (UMTS), and fourth generation systems, such as Long Term Evolution (LTE).

Under LTE, a User Equipment (UE) connects to the EPC over the LTE access network known as E-UTRAN (short for Evolved UMTS Terrestrial Radio Access Network) and communicates with a base station known as the Evolved NodeB (eNB), with the eNB being associated with one or more cells. The EPC is a packet-switched network in which the Internet Protocol is used for all transport services. The EPC is part of the $3^{rd}$ Generation Partnership Project (3GPP) specification.

Compared to previous homogenous networks consisting principally of macro cells, small cells are increasingly being used as part of LTE cellular networks. Pico cells (also known as "small cells") are smaller than macro cells (also known as "cells") and often operate at lower power than macro cells, but utilize the same network interface as macro cells. Femto cells, which are often limited to a small subscriber group, are not considered here. A cellular network consisting of both pico cells and macro cells is known as a heterogeneous networks (HetNet).

Whether homogeneous or heterogeneous, a UE that is part of a cellular network periodically performs measurements to ensure that it obtains ideal network coverage. There are several types of measurements that the UE may perform. Intra-frequency E-UTRAN measurements are measurements of the current cell and a target cell by the UE, both of which operate on the same carrier frequency. Inter-frequency E-UTRAN measurements take place when the target cell operates on a different carrier frequency than the current cell. There are also inter-RAT measurements that the UE may perform. Under 3GPP, a measurement gap is defined for performing the inter-frequency E-UTRAN measurements.

Because the measurement gap is defined to enable the UE to perform inter-frequency measurements, the measurement gap is also a period in which the UE can neither receive nor send transmissions. The measurements cost the UE some battery power, so there may be instances in which these periodic measurements may be performed not as often or at all. For example, if the UE is stationary, some power savings could be realized by the UE by decreasing the periodicity of the inter-frequency measurements.

To connect to a cell of a network, the UE first performs a very specific set of operations known as a cell search. During the cell search, multiple synchronization stages take place in which the UE obtains time and frequency parameters that enable the UE to demodulate downlink signals and transmit uplink signals correctly. Two physical signals, a Primary Synchronization Signal (PSS) and a Secondary Synchronization Signal (SSS), are broadcast in each cell to facilitate this synchronization. The PSS and SSS are located in specific positions of the radio frame known to the UE. PSS and SSS synchronization are part of the inter-frequency measurements performed by the UE.

For 3GPP Release 12, several options to reduce the UE power consumption impact during HetNet mobility inter-frequency small cell discovery are presented. These options have their drawbacks.

Thus, there is a desire for improving system performance and reducing unnecessary UE power consumption in a wireless cellular network.

BRIEF DESCRIPTION OF THE DRAWINGS

The foregoing aspects and many of the attendant advantages of this document will become more readily appreciated as the same becomes better understood by reference to the following detailed description, when taken in conjunction with the accompanying drawings, wherein like reference numerals refer to like parts throughout the various views, unless otherwise specified.

FIG. 7 is a table under LTE Release 12 showing the measurement gap pattern configuration for inter-frequency measurements, according to the prior art;

FIG. 8 is a novel information element used by the measurement gap enhancement method of FIG. 1 to perform RRC reconfiguration for synchronous networks, according to some embodiments;

FIG. 9 is a second table under LTE Release 12 showing suggested criteria for performing inter-frequency measurements, according to the prior art;

FIG. 10 is a second novel information element used by the measurement gap enhancement method of FIG. 1 to perform RRC reconfiguration for asynchronous networks, according to some embodiments.

DETAILED DESCRIPTION

In accordance with the embodiments described herein, a measurement gap enhancement method is disclosed for use in both synchronous and asynchronous networks. The measurement gap enhancement method employs a first measurement gap pattern, suitable for synchronous networks, including measurement gaps that are of shorter duration and available for more frequency measurements than in legacy implementations. The measurement gap enhancement method also employs a second measurement gap pattern, which also includes short duration measurement gaps, but is also characterized by flexible measurement gap repetition periods suited to asynchronous networks. The first and second measurement gap patterns are made known to a user equipment (UE) by way of novel information elements used during RRC connection reconfiguration by the enhanced NodeB (eNB) base station. The measurement gap enhancement method enables the UE to maintain its radio frequency setting between measurements, particularly automatic gain control.

In the following detailed description, reference is made to the accompanying drawings, which show by way of illustration specific embodiments in which the subject matter described herein may be practiced. However, it is to be understood that other embodiments will become apparent to those of ordinary skill in the art upon reading this disclosure. In other instances, well-known structures, materials, or operations are not shown or described in detail to avoid obscuring aspects of the disclosure. The following detailed description is, therefore, not to be construed in a limiting sense, as the scope of the subject matter is defined by the claims.

Figure 1:
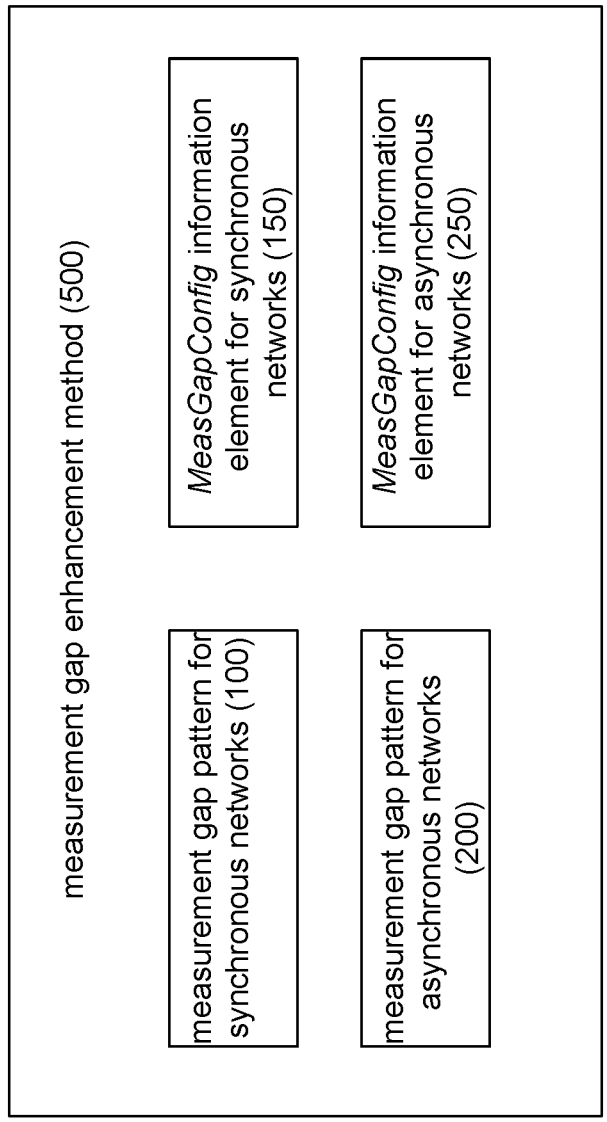
FIG. 1 is a simplified block diagram of a measurement gap enhancement method, according to some embodiments.

FIG. 1 is a simplified block diagram of a novel measurement gap enhancement method 500, according to some embodiments. The measurement gap enhancement method 500 is designed to ensure that a user equipment (UE) operating in a wireless cellular neighborhood is able to perform inter-frequency measurements using one of two novel measurement gap patterns 100, 200, the first for synchronous networks and the second for asynchronous networks. Two different MeasGapConfig information elements (IEs) 150, 250 are also part of the measurement gap enhancement method 500, also for synchronous and asynchronous networks, respectively, enable the eNB to provide the characteristics of the respective measurement gap patterns 100, 200 to the UE. In some embodiments, the inter-frequency measurements taken by the UE of neighboring cells are performed without the UE having to reset its radio frequency (RF) settings, including Automatic Gain Control (AGC). Each of the features of the measurement gap enhancement method 500 is described in more detail below.

Figure 2:
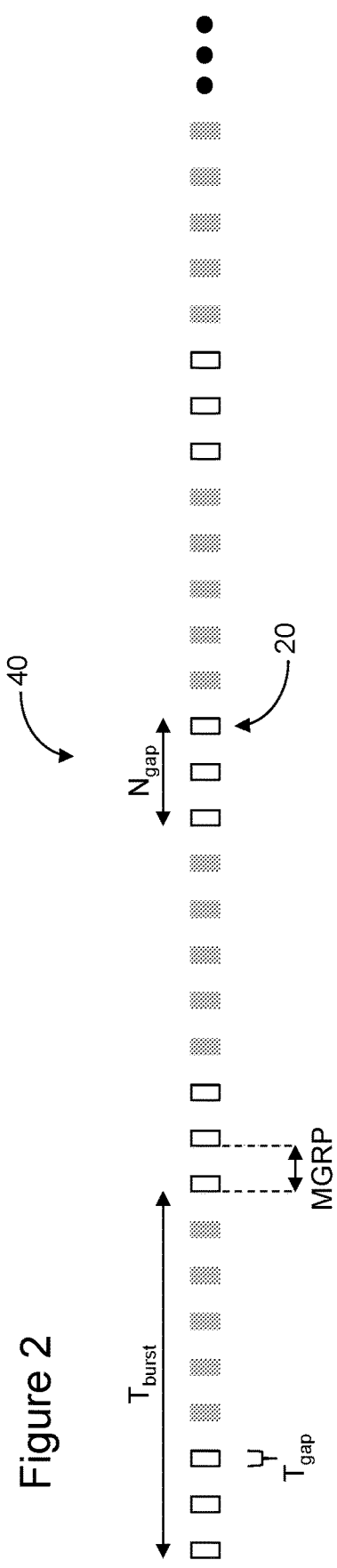
FIG. 2 is a diagram of a measurement gap pattern, according to the prior art.

FIG. 2 is a diagram of a measurement gap pattern 40 (also known as a burst gap pattern), according to the prior art. Introduced in Ran4 [R4-136032], the measurement gap pattern 40 shows bursts of gaps 20 (the terms "gap" and "measurement gap" are used herein interchangeably) occurring every $T_{burst}$. Within each $T_{burst}$ duration, $N_{gap}$ gaps occur. In FIG. 2, each $T_{burst}$ includes three gaps 20, with the grayed gaps indicating intervals where gaps do not occur (since $N_{gap}$ controls how many gaps occur in the $T_{burst}$ duration). Each gap has a duration ($T_{gap}$), also known as a measurement gap length (MGP), with the duration between the beginning of two adjacent gaps being the measurement gap repetition period (MGRP).

The measurement gap pattern 40 of FIG. 2 enables the UE to perform background searches for neighbor cells in which the carriers' frequencies are different (known also herein as "inter-frequency measurements", "inter-RAT measurements", or both "inter-frequency and inter-RAT measurements") every $T_{burst}$. The MGRP may be selected independently (e.g., 40 ms is typical). The measurement gap pattern 40 allows the UE to reuse radio frequency (RF) settings such as the gain setting between the gaps 20 in a manner similar to the gap pattern configurations of LTE Release 8 in which continuous gaps of relatively long periodicity are used for measurements. The measurement gap pattern 40 is designed to ensure that the UE can receive both the Primary Synchronization Signal (PSS) and the Secondary Synchronization Signal (SSS) during a single gap occurrence, $T_{gap}$. In FIG. 2, a $T_{gap}$ of 6 ms is presumed.

The measurement gap pattern 40 of FIG. 2 is one of several options discussed in R4-136032. One goal is to avoid having the UE reacquire suitable RF settings at the beginning of every gap. Advantageously, the measurement gap pattern 40 allows the UE to perform multiple PSS/SSS detection attempts relatively closely spaced in time. This means that if fast fading causes the first attempt at PSS/SSS detection to fail, even though the UE is in good coverage of a suitable offload cell, there is a possibility to detect the PSS and SSS of the cell in subsequent gaps, for example, one MGRP (e.g., 40 ms) later. Therefore, it is expected that, especially in fading conditions, the measurement gap pattern 40 could offer benefits compared to a legacy gap pattern having a continuous pattern of measurement gaps with a long periodicity, as in LTE Release 8.

Nevertheless, the suggested Ran4 options have their drawbacks. For example, the measurement gap pattern 40 has the following disadvantages:

The measurement gap length, $T_{gap}$, of 6 ms is too long based on the ongoing discussion in Release 13 System Information (SI) measurement gap enhancement.

Automatic Gain Control (AGC) adjustment benefits from having a longer convergence time because the interval between two gaps for the same carrier measurement is too long.

Automatic gain control is a feature of a radio that provides a controlled signal amplitude at its output even though the input signal amplitudes may vary. AGC is used in circuits in which the incoming signal can vary over a wide range.

Figure 3:
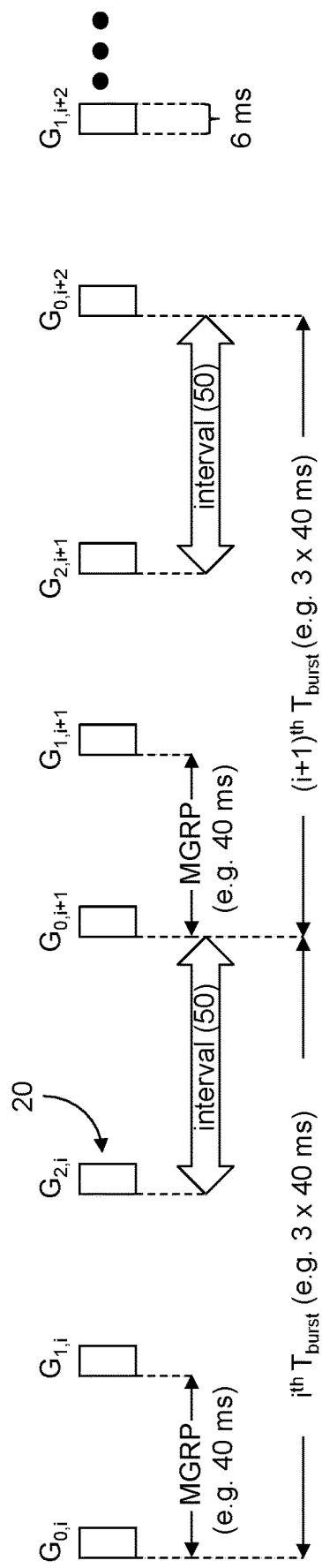
FIG. 3 is a second diagram of the measurement gap pattern of FIG. 2, according to the prior art.

The AGC disadvantage is illustrated in FIG. 3, which depicts another view of the measurement gap pattern 40. An $i^{th} T_{burst}$ is depicted having three gaps 20, denoted $G_{0,i}$, $G_{1,i}$, and $G_{2,i}$, is followed by an interval 50; subsequently, an $(i+1)^{th} T_{burst}$, also having three gaps 20, denoted $G_{0,i+1}$, $G_{1,i+1}$, and $G_{2,i+1}$, is followed by the interval 50, and so on.

The interval 50 is too long to guarantee the AGC is valid in the next measurement occasion. The interval 50 between the gap $G_{2,i}$ and the gap $G_{0,i+1}$ (as well as between gaps $G_{2,i+1}$ and $G_{0,i+2}$) for a same carrier is too far and would thus necessitate the UE to reset its RF setting.

Figure 4:
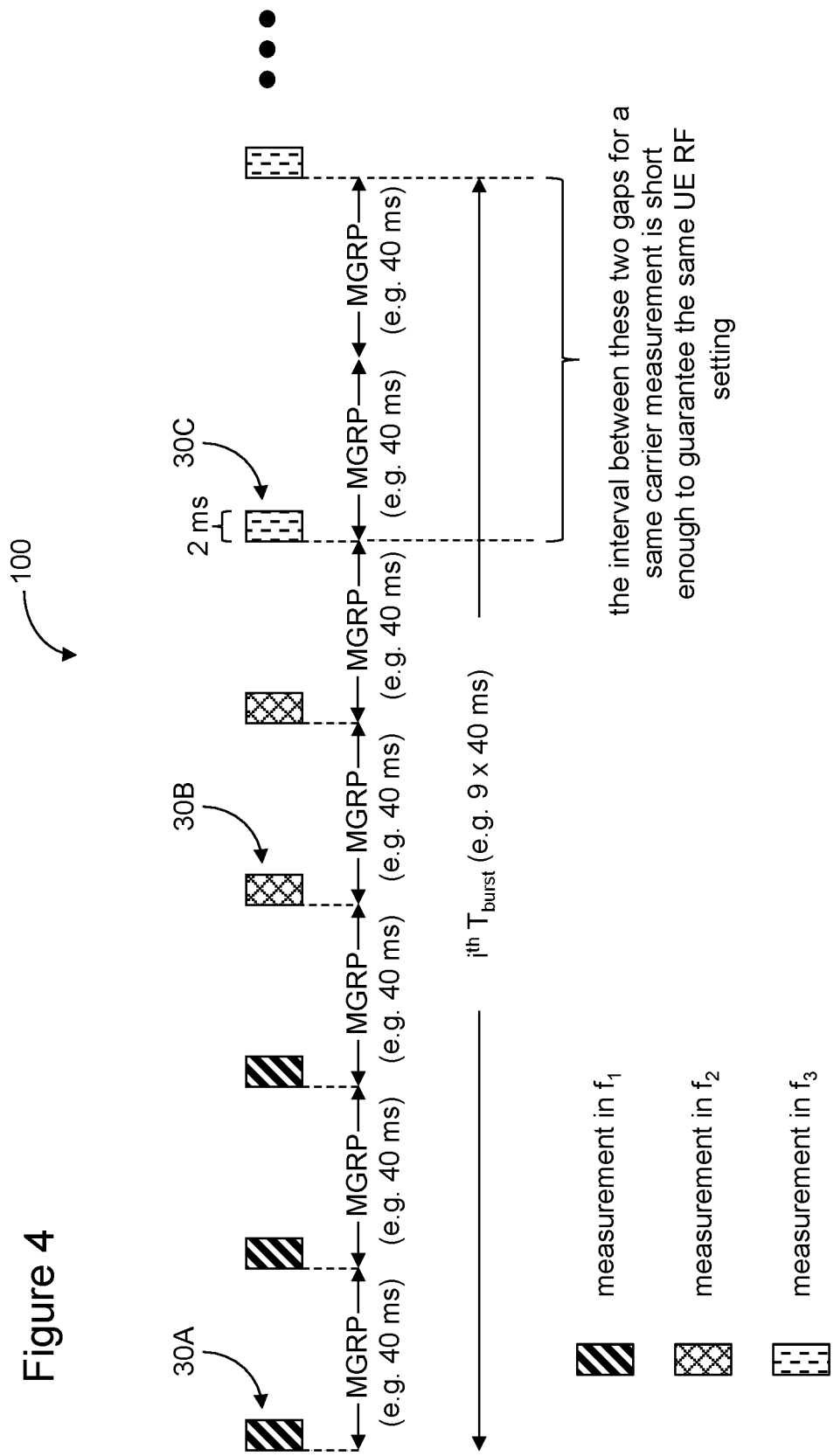
FIG. 4 is a novel measurement gap pattern used by the measurement gap enhancement method of FIG. 1 for synchronous measurement carriers, according to some embodiments.
Figure 5:
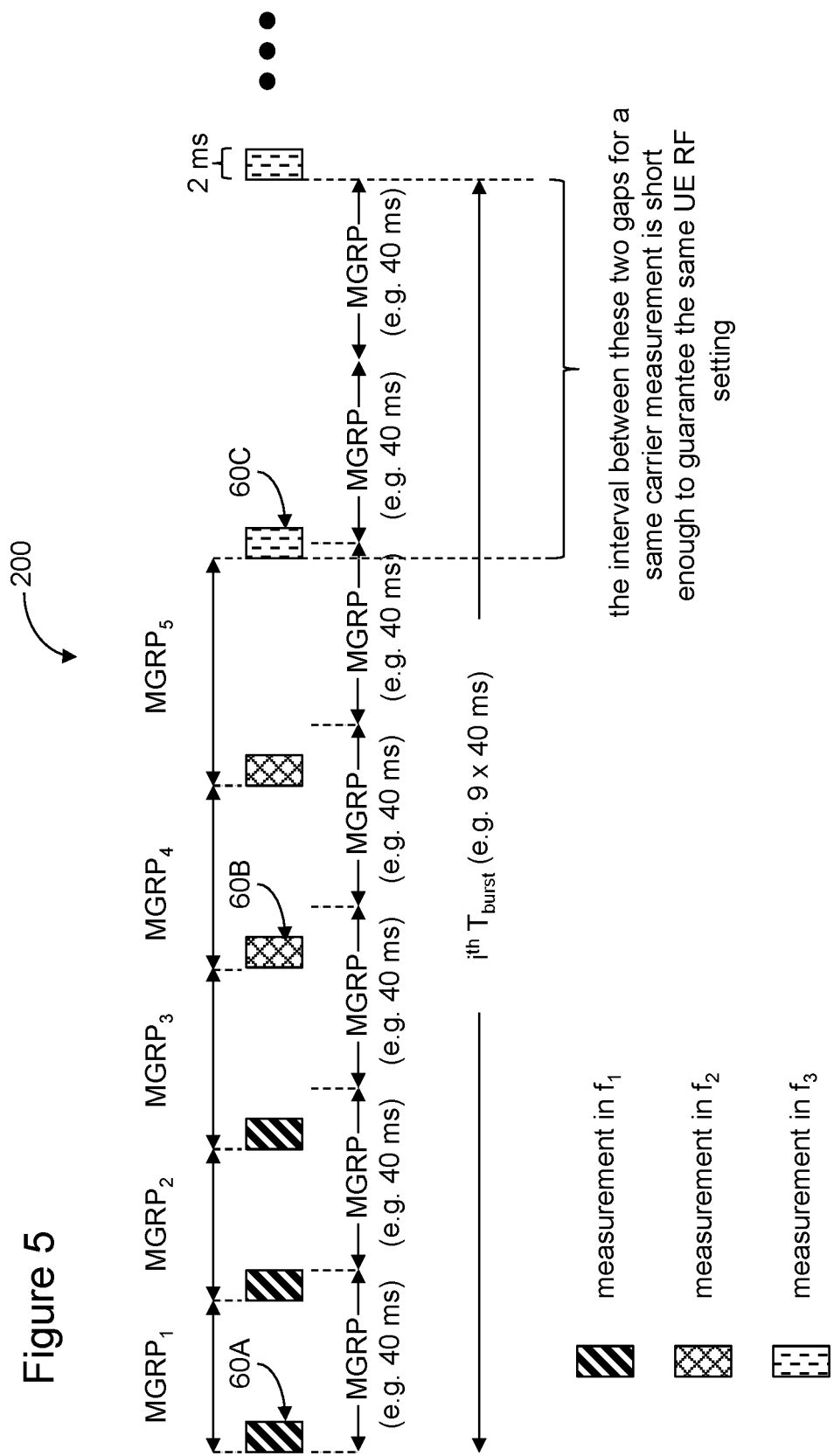
FIG. 5 is a novel measurement gap pattern used by the measurement gap enhancement method of FIG. 1 for asynchronous measurement carriers, according to some embodiments.

In some embodiments, to overcome the disadvantages of the measurement gap scheme depicted in FIGS. 2 and 3, a novel measurement gap pattern 100 is depicted in FIG. 4 for synchronous measurement carriers and a novel measurement gap pattern 200 is depicted in FIG. 5 for asynchronous measurement carriers. Each of these embodiments is described in more detail below.

Synchronous Measurement Carriers

When measurement carriers are synchronous, the location of the PSS and SSS for a cell search of each carrier can be known to UE. FIG. 4 is a novel measurement gap pattern 100 to be used for synchronous measurement carriers, according to some embodiments.

The measurement gap pattern 100 consists of an $i^{th}$ $T_{burst}$, which itself includes three gaps 30A for a first carrier frequency, $f_1$, two gaps 30B for a second carrier frequency, $f_2$, and two gaps 30C for a third carrier frequency, $f_3$ (collectively, "gaps 30"). The number of gaps in the measurement gap pattern vary according to how long it takes to perform the inter-frequency measurements. Thus, the gap 30A is in the first position of the interval, $T_{burst}$. The position of the second gap 30B depends on the time to complete the measurement in frequency, $f_1$. Here, the time for measurement in $f_1$ is assumed to be three MGRPs.

The three carrier frequencies may, for example, be carrier frequencies for three different cells in the vicinity of the UE. The three gaps 30A are each separated by a duration of MGRP; the third gap 30A and the first gap 30B are separated by a duration of MGRP; the two gaps 30B are each also separated by a duration of MGRP; the second gap 30B and the first gap 30C are separated by a duration of MGRP; the two measurement gaps 30C are separated by a duration of two MGRPs. In some embodiments, each gap 30 is 2 ms in duration. In FIG. 4, the $i^{th}$ $T_{burst}$ has a duration of seven MGRPs. However, the duration is configurable and, in some embodiments, is larger than the total measurement cycles used for all carrier frequencies, $f_1$ $f_2$, and $f_3$.

The final two measurement gaps 30C, used for the third carrier frequency, $f_3$, are separated by a duration of two MGRPs. Since the gaps are close to the last one, the interval between the two gaps is short enough to guarantee the same RF setting for the UE and thus the same AGC can be used for both measurements. In some embodiments, the measurement gap pattern 100 of FIG. 4 has other advantages:

- A burst of measurement gaps, such as occurs with the measurement gap pattern 100, enables the UE to perform mobility measurements for the carriers in the offloading layer every $T_{burst}$. An offloading layer references cells that mainly provide offloading services.
- A small gap with a shorter length (e.g., 2 ms) can be used. With the same data resource overhead, the more measurement opportunities can be provided for inter-frequency measurement.
- The UE can perform measurements on the multiple carriers, one by one. This can reduce the measurement delay as well.
- The same RF setting can be applied for the measurement on the adjacent measurement gap also if the measurement on the same carrier is not fulfilled in the last burst.

In some embodiments, the measurement gap pattern 100 of FIG. 4 provides the following benefits:

- Lower UE power consumption
- No impact on data scheduling
- The UE's AGC adjustment time can be reduced Asynchronous Measurement Carriers When measurement carriers are asynchronous, the location of the PSS and SSS for a cell search of each carrier can be known to UE. For synchronous networks, the subframe boundaries between the serving cell and neighbor cells can be aligned. The same is not true for asynchronous networks. Thus the location of PSS/SSS of measured neighbor cells can be known to UE in the synchronous networks. FIG. 5 is a novel measurement gap pattern 200 to be used for asynchronous measurement carriers, according to some embodiments.

The measurement gap pattern 200 consists of an $i^{th}$ $T_{burst}$, which itself includes three gaps 60A for a first carrier frequency, $f_1$, two gaps 60B for a second carrier frequency, $f_2$, and two gaps 60C for a third carrier frequency, $f_3$ (collectively, "gaps 60"). The three carrier frequencies may, for example, be carrier frequencies for three different cells in the vicinity of the UE. The number of gaps in the measurement gap pattern 200 may vary according to how long it takes to perform the inter-frequency measurements. Thus, the gap 60A is in the first position of the interval, $T_{burst}$. The position of the second gap 60B depends on the time to complete the measurement in frequency, $f_1$. Here, the time for measurement in $f_1$ is assumed to be the sum of MGRP$_1$, MGRP$_2$, and MGRP$_3$, which, in this example, is less than three MGRPs.

The first two of three gaps 60A are separated by a duration of MGRP$_1$; the second and third of the gaps 60A are separated by a duration of MGRP$_2$; the last gap 60A and the first gap 60B are separated by a duration of MGRP$_3$; the two gaps 60B are separated by a duration of MGRP$_4$; and the final gap 60B and the first gap 60C are separated by a duration of MGRP$_5$. In some embodiments, MGRP$_1$-MGRP$_5$ (known also herein as "flexible MGRPs"), may be greater than or less than MGRP. In some embodiments, each gap 60 is 2 ms in duration. In some embodiments, the flexible MGRPs are configured by the eNB using a MeasGapConfig information element, as described in more detail below. In FIG. 5, the $i^{th}$ $T_{burst}$ duration is configurable and, in some embodiments, is larger than the total measurement cycles used for all carrier frequencies, $f_1$, $f_2$, and $f_3$.

The measurement gaps 60C for the third measurement frequency, $f_3$, are separated by a duration of more than two MGRPs. Because the duration of the measurement gap 60 is smaller than in the prior art measurement gap patterns 40, the interval between the two gaps 60C is short enough to guarantee the same RF setting (e.g., less AGC adjustment) for the UE. In some embodiments, the measurement gap pattern 200 of FIG. 5 has other advantages:

- A burst of measurement gap, such as occurs with the measurement gap pattern 200, enables the UE to perform mobility measurements for offload cells every $T_{burst}$.
- A small gap with a shorter length (e.g., 2 ms) can be used. With the same data resource overhead, the more measurement opportunities can be provided for inter-frequency measurements.
- The measurement gap period between two gaps in a same burst can be not periodic in order to obtain PSS/SSS measurements within 5 ms.
- The UE can perform the measurement on the multiple carriers, one by one.
- The same RF setting can be applied for the measurement on the adjacent measurement burst also if the measurements on the same carrier are not fulfilled in the last burst.

Embodiment 1: LTE Inter-Frequency Measurement in a Synchronous Network

Figure 6:
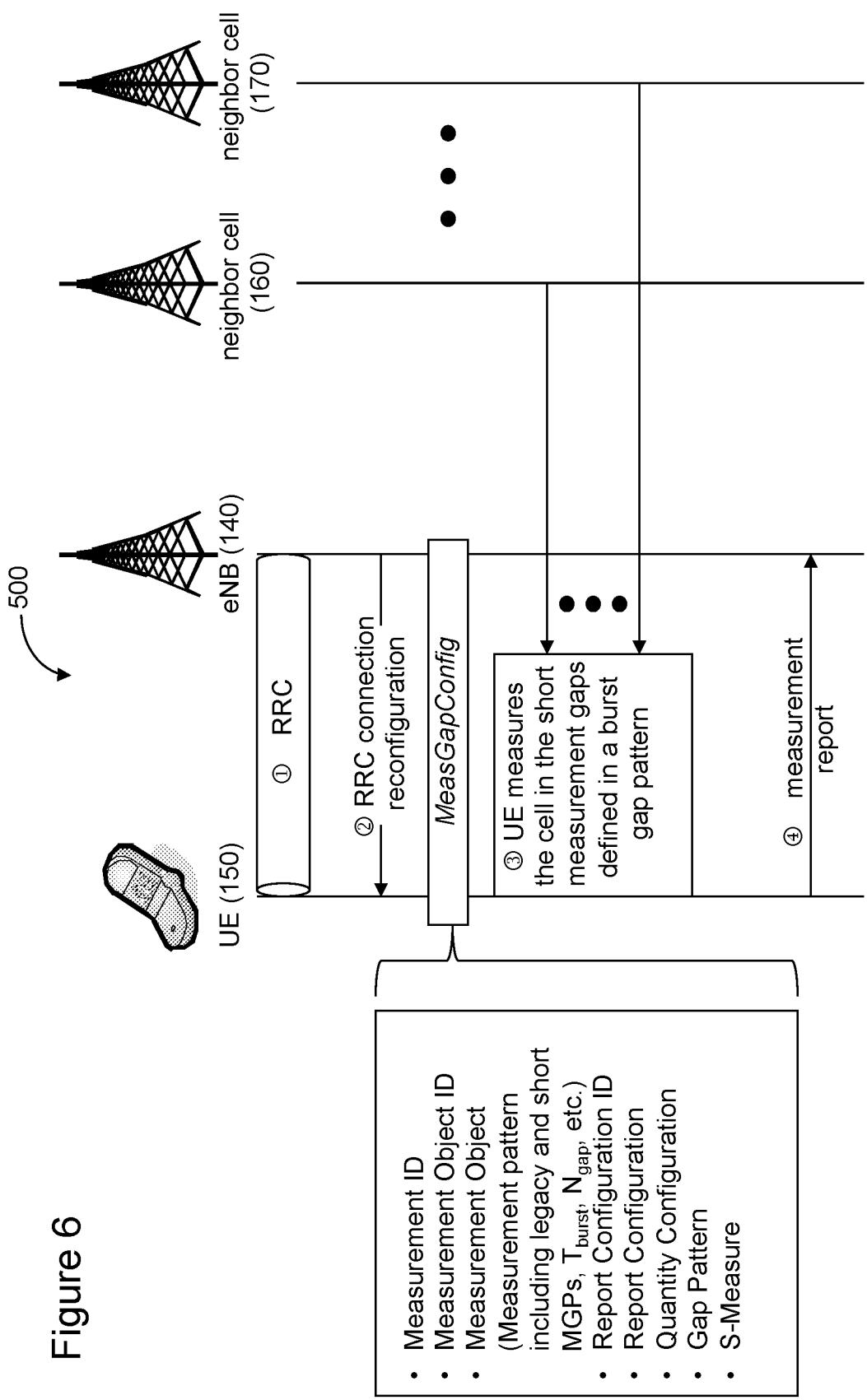
FIG. 6 is a detailed diagram of measurement gap enhancement method of FIG. 1 for performing LTE inter-frequency measurements in a synchronous network using the measurement gap pattern of FIG. 4 and in an asynchronous network using the measurement gap pattern of FIG. 5, according to some embodiments.

The detailed procedures for performing LTE inter-frequency measurements in a synchronous network are illustrated in FIG. 6, according to some embodiments. The entities involved are a UE 150 and multiple cells, a serving cell eNB 140 and two or more neighboring cells 160, . . . , 170.

A connection between the UE 150 and the eNB 140 is made via Radio Resource Control (RRC) signaling (step 1). The RRC protocol is used to establish radio bearers between the eNB and the UE. Because the UE may have multiple applications running simultaneously, different radio bearers are assigned for each of these applications. The RRC state of the UE can be either RRC_IDLE or RRC_CONNECTED, denoting an idle UE or a connected UE, respectively. The UE in RRC_IDLE performs cell selection to determine on which cell to camp, at which point the UE is RRC_CONNECTED. The UE in RRC_IDLE also monitors a paging channel to detect any incoming calls.

RRC is also used for modification and release of an RRC connection, as well as measurement configuration and reporting for intra-frequency, inter-frequency, and inter-RAT mobility. The measurement configuration and reporting includes the configuration and activation of measurement gaps, such as the gaps 30 (FIG. 4) and 60 (FIG. 5). Thus, the eNB 140 initiates an RRC connection reconfiguration with an information element, MeasGapConfig (step 2). The MeasGapConfig information element defines several parameters used by the measurement gap enhancement method 500: the measurement pattern including legacy and short MGPs, $T_{burst}$, $N_{gap}$, and so on, as well as the gap pattern.

In some embodiments, the configuration done by the LTE eNB 140 in step 2 conforms to the supported measurement gap configurations noted in the 3GPP TS 36.133 for a UE performing inter-frequency/inter-RAT measurements. The Table 300 in FIG. 7 includes a gap pattern ID, a measurement gap length (MGL) (ms), the measurement gap repetition period (MGRP) (ms), the number of gaps per burst ($N_{gap}$), the measurement gap repetition period ($T_{burst}$) (ms), a minimum available time for inter-frequency and inter-RAT measurements during a 480 ms period ($T_{inter1}$) (ms), and a measurement purpose.

A novel RRC signaling information element 150, MeasGapConfig, is given in FIG. 8, in some embodiments. New gap pattern fields, denoted gp2 and gp3, are defined with a small measurement gap duration to enable the UE to perform offloading carrier measurements. Also part of the MeasGapConfig information element is a numberMeasCarrierOffloading field that is referenced in the last two rows of the table 300 in FIG. 7. The MeasGapConfig information element shows that, in some embodiments, $N_{gap}$ can vary from 0-16.

Returning to FIG. 6, once the eNB 140 has successfully completed the RRC reconfiguration, the UE 150 is able to take inter-frequency measurements using the short measurement gap and the measurement gap pattern (step 3), such as the measurement gap pattern 100 of FIG. 4, with the gaps 30 having durations shorter than for legacy measurement gaps. In FIG. 6, the inter-frequency measurements are of the neighboring cells 160, . . . , 170. The UE 150 performs the measurements on the carriers of the offloading layer with the shorter measurement gap, one by one. In other words, once the UE has completed the measurement on one carrier, the next gap can be used for other carriers. During these measurements, in some embodiments, the UE's RF setting is maintained. Once the measurements are completed, the UE sends a measurement report to the serving eNB 140 (step 4).

Embodiment 2: LTE Inter-Frequency Measurement in Asynchronous Network

For LTE inter-frequency measurements in an asynchronous network, FIG. 6 also illustrates the steps to be taken. This time however, the measurement gap pattern 200 of FIG. 5 is used and the MeasGapConfig information element is modified, as indicated in FIG. 10. Finally, the Table 400 in FIG. 9 illustrates that the measurement gap enhancement method 500 conforms to the supported measurement gap configurations noted in the 3GPP TS 36.133 for a UE performing inter-frequency/inter-RAT measurements.

The first two steps are similar to what is done in the synchronous network embodiment, above. Once a connection between the UE 150 and the eNB 140 is made through RRC signaling (step 1), the eNB performs an RRC connection reconfiguration with information element MeasGapConfig (step 2). Then, the UE 150 performs the measurement on the carriers of the offloading layer, using the measurement gap pattern 200 with shorter measurement gaps (FIG. 5), one by one. That is, once the UE 150 completes the measurement on one carrier, the next gap in the measurement gap pattern 200 can be used for other carriers. At the same time, the UE's RF setting can be maintained (step 3).

Recall from FIG. 5 that the gaps 60 in the measurement gap pattern 200 are separated by flexible MGRPs such that the distance between gaps is variable. In an asynchronous network, this enables the UE to capture a PSS/SSS for a succeeding carrier without having to wait for the predefined (MGRP) periodicity that characterizes legacy implementations. Thus, the UE 150 can perform a measurement of the serving cell 140, followed by neighboring cell 160, . . . , and finally neighboring cell 170, with the periodicity between cell measurements being variable according to the configuration of the flexible MGRPs established by the eNB 140 in step 2. After performing the measurements, the UE 150 sends a measurement report to the eNB 140 (step 4).

In FIG. 10, the signaling information element 250, MeasGapConfig, is different from the one in FIG. 8. New gap pattern fields, denoted gp2-gp7, are defined with a small measurement gap duration to enable the UE to perform offloading carrier measurements. Also part of the MeasGapConfig information element is a numberMeasCarrierOffloading field that is referenced in the fifth column of the table 400 in FIG. 9. The MeasGapConfig information element shows that, in some embodiments, $N_{gap}$ can vary from 0-16.

As used herein, the term "circuitry" may refer to, be part of, or include an ASIC, an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

Figure 11:
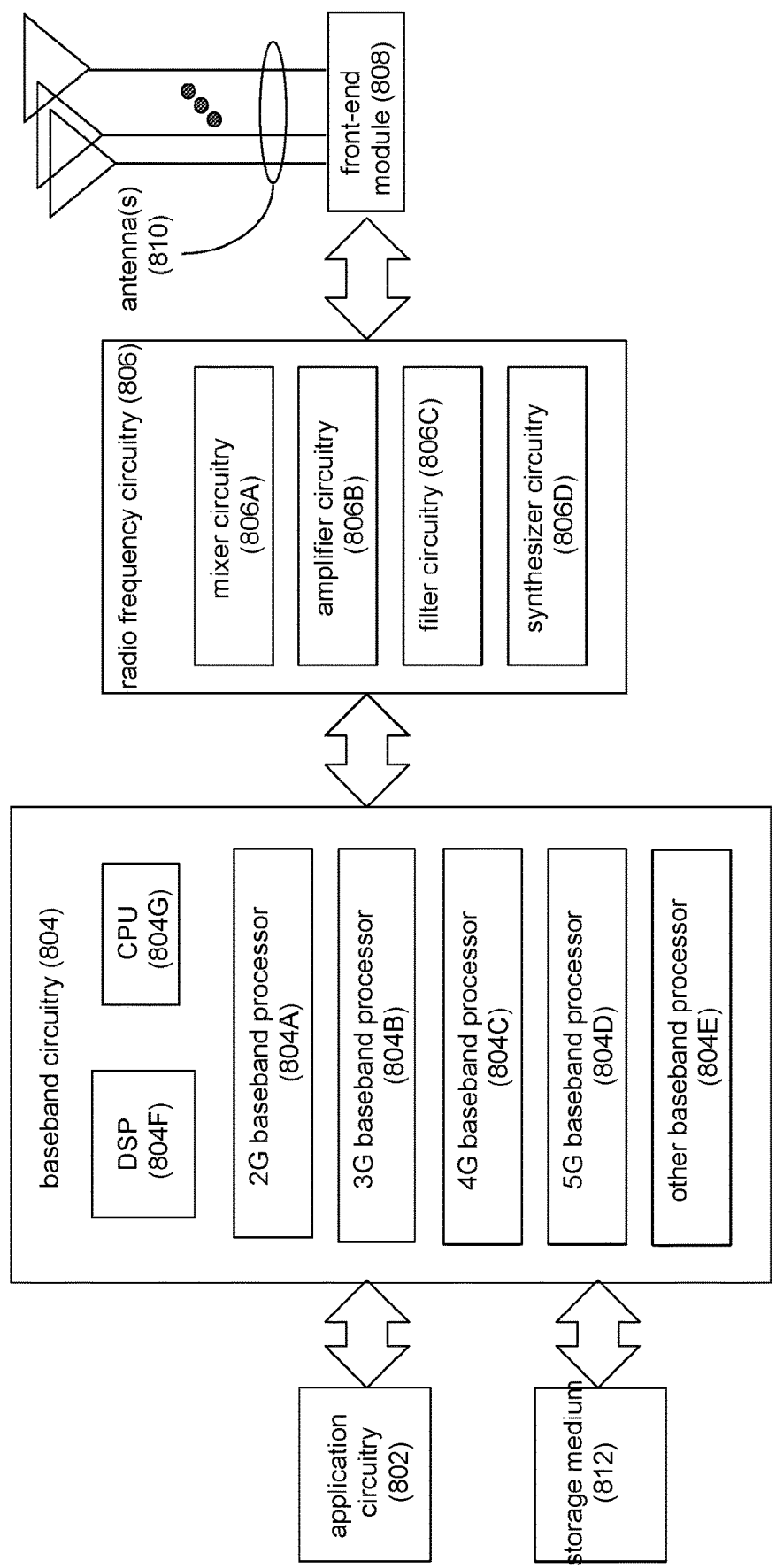
FIG. 11 is an user equipment capable of performing the measurement gap enhancement method of FIG. 1, according to some embodiments.

Embodiments described herein may be implemented into a system using any suitably configured hardware and/or software. FIG. 11 illustrates, for one embodiment, example components of a User Equipment (UE) device 800. In some embodiments, the UE device 800 may include application circuitry 802, baseband circuitry 804, Radio Frequency (RF) circuitry 806, front-end module (FEM) circuitry 808 and one or more antennas 810, coupled together at least as shown.

The application circuitry 802 may include one or more application processors. For example, the application circuitry 802 may include circuitry such as, but not limited to, one or more single-core or multi-core processors. The processor(s) may include any combination of general-purpose processors and dedicated processors (e.g., graphics processors, application processors, etc.). The processors may be coupled with and/or may include a storage medium 812 or other type of memory/storage and may be configured to execute instructions stored in the memory/storage to enable various applications and/or operating systems to run on the system.

The baseband circuitry 804 may include circuitry such as, but not limited to, one or more single-core or multi-core processors. The baseband circuitry 804 may include one or more baseband processors and/or control logic to process baseband signals received from a receive signal path of the RF circuitry 806 and to generate baseband signals for a transmit signal path of the RF circuitry 806. Baseband processing circuitry 804 may interface with the application circuitry 802 for generation and processing of the baseband signals and for controlling operations of the RF circuitry 806. For example, in some embodiments, the baseband circuitry 804 may include a second generation (2G) baseband processor 804A, third generation (3G) baseband processor 804B, fourth generation (4G) baseband processor 804C, and/or other baseband processor(s) 804D for other existing generations, generations in development, or to be developed in the future (e.g., fifth generation (5G), 6G, etc.). The baseband circuitry 804 (e.g., one or more of baseband processors 804A-D) may handle various radio control functions that enable communication with one or more radio networks via the RF circuitry 806. The radio control functions may include, but are not limited to, signal modulation/demodulation, encoding/decoding, radio frequency shifting, etc. In some embodiments, modulation/demodulation circuitry of the baseband circuitry 804 may include Fast-Fourier Transform (FFT), precoding, and/or constellation mapping/demapping functionality. In some embodiments, encoding/decoding circuitry of the baseband circuitry 804 may include convolution, tail-biting convolution, turbo, Viterbi, and/or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 804 may include elements of a protocol stack such as, for example, elements of an EUTRAN protocol including, for example, physical (PHY), media access control (MAC), radio link control (RLC), packet data convergence protocol (PDCP), and/or radio resource control (RRC) elements. A central processing unit (CPU) 804E of the baseband circuitry 804 may be configured to run elements of the protocol stack for signaling of the PHY, MAC, RLC, PDCP, and/or RRC layers. In some embodiments, the baseband circuitry may include one or more audio digital signal processor(s) (DSP) 804F. The audio DSP(s) 804F may include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 804 and the application circuitry 802 may be implemented together such as, for example, on a system on a chip (SOC).

In some embodiments, the baseband circuitry 804 may provide for communication compatible with one or more radio technologies. For example, in some embodiments, the baseband circuitry 804 may support communication with an EUTRAN and/or other wireless metropolitan area networks (WMAN), a wireless local area network (WLAN), or a wireless personal area network (WPAN). Embodiments in which the baseband circuitry 804 is configured to support radio communications of more than one wireless protocol may be referred to as multi-mode baseband circuitry.

RF circuitry 806 may enable communication with wireless networks using modulated electromagnetic radiation through a non-solid medium. In various embodiments, the RF circuitry 806 may include switches, filters, amplifiers, etc., to facilitate the communication with the wireless network. RF circuitry 806 may include a receive signal path which may include circuitry to down-convert RF signals received from the FEM circuitry 808 and provide baseband signals to the baseband circuitry 804. RF circuitry 806 may also include a transmit signal path which may include circuitry to up-convert baseband signals provided by the baseband circuitry 804 and provide RF output signals to the FEM circuitry 808 for transmission.

In some embodiments, the RF circuitry 806 may include a receive signal path and a transmit signal path. The receive signal path of the RF circuitry 806 may include mixer circuitry 806A, amplifier circuitry 806B and filter circuitry 806C. The transmit signal path of the RF circuitry 806 may include filter circuitry 806C and mixer circuitry 806A. RF circuitry 806 may also include synthesizer circuitry 806D for synthesizing a frequency for use by the mixer circuitry 806A of the receive signal path and the transmit signal path. In some embodiments, the mixer circuitry 806A of the receive signal path may be configured to down-convert RF signals received from the FEM circuitry 808 based on the synthesized frequency provided by synthesizer circuitry 806D. The amplifier circuitry 806B may be configured to amplify the down-converted signals and the filter circuitry 806C may be a low-pass filter (LPF) or band-pass filter (BPF) configured to remove unwanted signals from the down-converted signals to generate output baseband signals. Output baseband signals may be provided to the baseband circuitry 804 for further processing. In some embodiments, the output baseband signals may be zero-frequency baseband signals, although this is not a requirement. In some embodiments, mixer circuitry 806A of the receive signal path may comprise passive mixers, although the scope of the embodiments is not limited in this respect.

In some embodiments, the mixer circuitry 806A of the transmit signal path may be configured to up-convert input baseband signals based on the synthesized frequency provided by the synthesizer circuitry 806D to generate RF output signals for the FEM circuitry 808. The baseband signals may be provided by the baseband circuitry 804 and may be filtered by filter circuitry 806C. The filter circuitry 806C may include a low-pass filter (LPF), although the scope of the embodiments is not limited in this respect.

In some embodiments, the mixer circuitry 806A of the receive signal path and the mixer circuitry 806A of the transmit signal path may include two or more mixers and may be arranged for quadrature down-conversion and/or up-conversion, respectively.

In some embodiments, the mixer circuitry 806A of the receive signal path and the mixer circuitry 806A of the transmit signal path may include two or more mixers and may be arranged for image rejection (e.g., Hartley image rejection). In some embodiments, the mixer circuitry 806A of the receive signal path and the mixer circuitry may be arranged for direct down-conversion and/or direct up-conversion, respectively. In some embodiments, the mixer circuitry 806A of the receive signal path and the mixer circuitry of the transmit signal path may be configured for superheterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 806 may include analog-to-digital converter (ADC) and digital-to-analog converter (DAC) circuitry and the baseband circuitry 804 may include a digital baseband interface to communicate with the RF circuitry 806.

In some dual-mode embodiments, a separate radio IC circuitry may be provided for processing signals for each spectrum, although the scope of the embodiments is not limited in this respect.

In some embodiments, the synthesizer circuitry 806D may be a fractional-N synthesizer or a fractional N/N+1 synthesizer, although the scope of the embodiments is not limited in this respect as other types of frequency synthesizers may be suitable. For example, synthesizer circuitry 806D may be a delta-sigma synthesizer, a frequency multiplier, or a synthesizer comprising a phase-locked loop with a frequency divider.

The synthesizer circuitry 806D may be configured to synthesize an output frequency for use by the mixer circuitry 806A of the RF circuitry 806 based on a frequency input and a divider control input. In some embodiments, the synthesizer circuitry 806D may be a fractional N/N+1 synthesizer.

In some embodiments, frequency input may be provided by a voltage controlled oscillator (VCO), although that is not a requirement. Divider control input may be provided by either the baseband circuitry 804 or the applications processor 802, depending on the desired output frequency. In some embodiments, a divider control input (e.g., N) may be determined from a look-up table based on a channel indicated by the applications processor 802.

Synthesizer circuitry 806D of the RF circuitry 806 may include a divider, a delay-locked loop (DLL), a multiplexer, and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump, and a D-type flip-flop. In these embodiments, the delay elements may be configured to break a VCO period up into $N_d$ equal packets of phase, where $N_d$ is the number of delay elements in the delay line. In this way, the DLL provides negative feedback to help ensure that the total delay through the delay line is one VCO cycle.

In some embodiments, synthesizer circuitry 806D may be configured to generate a carrier frequency as the output frequency, while in other embodiments, the output frequency may be a multiple of the carrier frequency (e.g., twice the carrier frequency, four times the carrier frequency), and used in conjunction with quadrature generator and divider circuitry to generate multiple signals at the carrier frequency with multiple different phases with respect to each other. In some embodiments, the output frequency may be a LO frequency ($f_{LO}$). In some embodiments, the RF circuitry 806 may include an IQ/polar converter.

FEM circuitry 808 may include a receive signal path which may include circuitry configured to operate on RF signals received from one or more antennas 810, amplify the received signals and provide the amplified versions of the received signals to the RF circuitry 806 for further processing. FEM circuitry 808 may also include a transmit signal path which may include circuitry configured to amplify signals for transmission provided by the RF circuitry 806 for transmission by one or more of the one or more antennas 810.

In some embodiments, the FEM circuitry 808 may include a TX/RX switch to switch between transmit mode and receive mode operation. The FEM circuitry may include a receive signal path and a transmit signal path. The receive signal path of the FEM circuitry may include a low-noise amplifier (LNA) to amplify received RF signals and provide the amplified received RF signals as an output (e.g., to the RF circuitry 806). The transmit signal path of the FEM circuitry 808 may include a power amplifier (PA) to amplify input RF signals (e.g., provided by RF circuitry 806), and one or more filters to generate RF signals for subsequent transmission (e.g., by one or more of the one or more antennas 810.

In some embodiments, the UE device 800 may include additional elements such as, for example, memory/storage, display, camera, sensor, and/or input/output (I/O) interface.

Various techniques, or certain aspects or portions thereof, may take the form of program code (i.e., instructions) embodied in tangible media, such as floppy diskettes, CD-ROMs, hard drives, non-transitory computer readable storage medium, or any other machine-readable storage medium wherein, when the program code is loaded into and executed by a machine, such as a computer, the machine becomes an apparatus for practicing the various techniques. A non-transitory computer-readable storage medium can be a computer-readable storage medium that does not include a signal. In the case of program code execution on programmable computers, the computing device may include a processor, a storage medium readable by the processor (including volatile and non-volatile memory and/or storage elements), at least one input device, and at least one output device. The volatile and non-volatile memory and/or storage elements may be a RAM, EPROM, flash drive, optical drive, magnetic hard drive, solid-state drive, or other medium for storing electronic data. The node and wireless device may also include a transceiver module, a computer module, a processing module, and/or a clock module or timer module. One or more programs that may implement or utilize the various techniques described herein may use an application programming interface (API), reusable controls, and the like. Such programs may be implemented in a high-level procedure or object-oriented programming language to communicate with a computer system. However, the program(s) may be implemented in assembly or machine language, if desired. In any case, the language may be a compiled or interpreted language, and combined with hardware implementations.

It should be understood that many of the functional units described in the specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices, or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module may be not physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. The modules may be passive or active, including agents operable to perform desired functions.

Reference throughout this specification to "an example" or means that a particular feature, structure, or characteristic described in connection with the example is included in at least one embodiment. Thus, appearances of the phrases, "in an example" or "in some embodiments" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and examples may be referred to herein along with alternatives for the various components thereof. It is understood that such embodiments, examples, and alternatives are not to be construed as de facto equivalents of one another, but are to be considered as separate and autonomous representations. Furthermore, the described features, structures, or characteristics may be combined in any suitable manner in one or more embodiments.

In summary, the measurement gap enhancement method 500 can be implemented, in a first example, as part of a user equipment (UE) to occupy a cellular network operating according to a Long Term Evolution (LTE) wireless standard, the UE to perform a plurality of measurements, the user equipment to receive a Radio Resource Control (RRC) reconfiguration message, the RRC message comprising an information element (IE) to indicate a measurement gap pattern comprising a predetermined number of measurement gaps separated by one or more measurement gap repetition periods (MGRPs), the predetermined number of measurement gaps each comprising a predetermined duration, perform a first measurement during a first measurement gap of the plurality of measurement gaps, and perform a second measurement during a second measurement gap of the plurality of measurement gaps, wherein the UE is to perform the second measurement without resetting its radio frequency configuration.

Further to the first example or any other example discussed herein, in a second example, the measurement gap pattern comprises first X measurement gaps for performing a measurement of a cell at a first frequency, wherein X is selected so as to complete the cell measurement, and second Y measurement gaps for performing a measurement of a second cell at a second frequency, wherein Y is selected so as to complete the second cell measurement and Y is not selected until after the cell measurement is completed.

Further to the first example or any other example discussed herein, in a third example, the measurement gap pattern comprises a first measurement gap, a second measurement gap, wherein a MGRP between the second measurement gap and the first measurement gap is a first duration, a third measurement gap, wherein a second MGRP between the third measurement gap and the second measurement gap is a second duration, wherein the first duration is not equal to the second duration.

Further to any one of the first three examples or any other example discussed herein, in a fourth example, the predetermined duration is smaller than 6 ms.

Further to any one of the first three examples or any other example discussed herein, in a fifth example, the predetermined duration is smaller than 2 ms.

Further to any one of the first four examples or any other example discussed herein, in a sixth example, the first measurement is of a first cell at a first frequency and the second measurement is of a second cell at a second frequency.

Further to any one of the first six examples or any other example discussed herein, in a seventh example, the first measurement is an inter-frequency measurement of an adjoining cell.

Further to any one of the first seven examples or any other example discussed herein, in an eighth example, the first measurement is an inter-radio access technology (inter-RAT) measurement of an adjoining cell.

Further to any one of the first eight examples or any other example discussed herein, in a ninth example, the predetermined number of measurement gaps is indicated by the RRC reconfiguration message.

Further to any one of the fifth through ninth examples or any other example discussed herein, in a tenth example, the MGRPs are configured periodically for measurements on synchronous neighboring cells.

Further to any one of the fifth through ninth examples or any other example discussed herein, in an eleventh example, the MGRPs are configured non-periodically for measurements on asynchronous neighboring cells.

Further to any one of the fifth through ninth examples or any other example discussed herein, in a twelfth example, the MGRPs are configured periodically but with different gap offsets for measurements on asynchronous neighboring cells.

Further to the first example or any other example discussed herein, in a thirteenth example, the first and second measurement gaps are non-periodic and based on a unified MGRP with specified offsets.

Further to the thirteenth example or any other example discussed herein, in a fourteenth example, the specified offsets are signaled by the measurement gap pattern.

Further to the first example or any other example discussed herein, in a fifteenth example, the UE further comprises an automatic gain control, wherein the automatic gain control is not adjusted between performing the first measurement and the second measurement.

Further, the measurement gap enhancement method 500 can be implemented, in a sixteenth example, in an apparatus of a user equipment (UE) to be operable in a wireless cellular network conforming to a long term evolution (LTE) standard, the apparatus comprising a plurality of antennas to receive and transmit signals, and baseband circuitry to receive a Radio Resource Control (RRC) reconfiguration message, the RRC message comprising an information element (IE) to indicate a measurement gap pattern comprising a plurality of measurement gaps separated by one or more measurement gap repetition periods (MGRPs), wherein the measurement gap pattern comprises first measurement gaps for performing a measurement of a cell at a first frequency, wherein the number of first measurement gaps is selected so as to complete the cell measurement, and second measurement gaps for performing a measurement of a second cell at a second frequency, wherein the number of second measurement gaps is selected so as to complete the second cell measurement, wherein the second number of measurement gaps is not selected until after the cell measurement is completed, wherein the apparatus is to perform the second measurement without resetting its radio frequency configuration.

Further to the sixteenth example or any other example discussed herein, in a seventeenth example, each of the plurality of measurement gaps comprises a duration of less than 6 milliseconds.

Further to the sixteenth example or any other example discussed herein, in an eighteenth example, each of the plurality of measurement gaps comprises a duration of less than 2 milliseconds.

Further to the sixteenth example or any other example discussed herein, in a nineteenth example, the apparatus further comprises radio frequency circuitry coupled between the plurality of antennas and the baseband circuitry.

Further to the nineteenth example or any other example discussed herein, in a twentieth example, the radio frequency circuitry further comprises an automatic gain control, wherein the automatic gain control is not adjusted between performing the first cell measurement and the second cell measurement.

Further to any one of the sixteenth through twentieth examples or any other example discussed herein, in a twenty-first example, the MGRPs are configured periodically for measurements on synchronous neighboring cells.

Further to any one of the sixteenth through twentieth examples or any other example discussed herein, in a twenty-second example, the MGRPs are configured non-periodically for measurements on asynchronous neighboring cells.

Further to any one of the sixteenth through twentieth examples or any other example discussed herein, in a twenty-third example, the MGRPs are configured periodically but with different gap offsets for measurements on asynchronous neighboring cells.

Further to any one of the sixteenth through twentieth examples or any other example discussed herein, in a twenty-fourth example, the measurement gaps are non-periodic and based on a unified MGRP with specified offsets.

Further, the measurement gap enhancement method 500 can be implemented, in a twenty-fifth example, in an article comprising a computer-readable medium comprising instructions to cause an electronic device, upon execution of instructions by one or more processors of the electronic device, to realize an apparatus as claimed in any preceding claim.

While the foregoing examples are illustrative of the principles in one or more particular applications, it will be apparent to those of ordinary skill in the art that numerous modifications in form, usage, and details of implementation can be made without the exercise of inventive faculty, and without departing from the principles and concepts herein and will appreciate numerous modifications and variations therefrom. It is intended that the appended claims cover all such modifications and variations as fall within the true spirit and scope of the disclosed embodiments.

We claim:

1. A user equipment (UE) to occupy a cellular network operating according to a Long Term Evolution (LTE) wireless standard, the UE comprising:
    a processor; and
    a memory coupled to the processor, the memory comprising instructions to be executed by the processor, the instructions enabling the user equipment to:
        receive a Radio Resource Control (RRC) reconfiguration message, the RRC reconfiguration message comprising an information element (IE), the IE received as a single IE;
        wherein the IE comprises indications of measurement gap patterns associated with different frequencies, the measurement gap patterns comprising different measurement gaps separated by different measurement gap repetition periods (MGRPs) with different durations, the different measurement gaps further comprising first measurement gaps, second measurement gaps, and third measurement gaps that are associated with the different frequencies, respectively, as indicated in the single IE received during an RRC connection reconfiguration;
        perform a first measurement of a first cell at a first frequency using the first measurement gaps;
        perform a second measurement of a second cell at a second frequency using the second measurement gaps; and
        perform a third measurement of a third cell at a third frequency using the third measurement gaps;
    wherein the UE is configured to perform the first measurement, the second measurement, and the third measurement within a same burst period;
    wherein the MGRPs are within the same burst period and differ in duration based on a position where the first cell measurement is completed.

2. The UE of claim 1, wherein the measurement gap patterns comprise:
    first X measurement gaps for performing the first measurement, wherein X is selected so as to complete the first measurement;
    second Y measurement gaps for performing the second measurement, wherein Y is selected so as to complete the second measurement and Y is not selected until after the first measurement is completed; and
    third Z measurement gaps for performing the third measurement, wherein Z is selected so as to complete the third measurement and Z is not selected until after the second measurement is completed.

3. The UE of claim 1, wherein the measurement gap patterns comprise:
    a first measurement gap;
    a second measurement gap, wherein a MGRP between the second measurement gap and the first measurement gap is a first duration;
    a third measurement gap, wherein a second MGRP between the third measurement gap and the second measurement gap is a second duration;
    wherein the first duration is not equal to the second duration.

4. The UE of claim 1, wherein a duration is smaller than 6 ms.

5. The UE of claim 1, wherein a duration is 2 ms.

6. The UE of claim 5, wherein the MGRPs are configured periodically for measurements on synchronous neighboring cells.

7. The UE of claim 5, wherein the MGRPs are configured non-periodically for measurements on asynchronous neighboring cells.

8. The UE of claim 5, wherein the MGRPs are configured periodically but with different gap offsets for measurements on asynchronous neighboring cells.

9. The UE of claim 1, wherein the first measurement is an inter-frequency measurement of an adjoining cell.

10. The UE of claim 1, wherein the first measurement is an inter-radio access technology (inter-RAT) measurement of an adjoining cell.

11. The UE of claim 1, wherein the measurement gaps are indicated by the RRC reconfiguration message.

12. The UE of claim 1, wherein the first, second, and third measurement gaps are non-periodic and based on a unified MGRP with specified offsets.

13. The UE of claim 12, wherein the specified offsets are signaled by a measurement gap pattern.

14. The UE of claim 1, further comprising: an automatic gain control;
wherein the automatic gain control is not adjusted between performing the first measurement, the second measurement, and the third measurement.

15. The UE of claim 1, wherein measurement gaps in the MGRPs vary according to a configurable duration to perform inter-frequency measurements among the first frequency, the second frequency and the third frequency in the same burst period.

16. The UE of claim 1, wherein two gaps within the same burst period are configured to enable one or more synchronization signal measurements within 5 ms.

17. An apparatus of a user equipment (UE) to be operable in a wireless cellular network conforming to a long-term evolution (LTE) standard, the apparatus comprising:
a plurality of antennas to receive and transmit signals; and
baseband circuitry to:
receive a Radio Resource Control (RRC) reconfiguration message during an RRC connection reconfiguration, the RRC reconfiguration message comprising an information element (IE) as a single IE;
wherein the IE comprises indications of measurement gap patterns associated with different frequencies, the measurement gap patterns comprising a plurality of measurement gaps separated by different measurement gap repetition periods (MGRPs) with different durations, wherein a measurement gap pattern comprises:
first measurement gaps for performing a first cell measurement at a first frequency, wherein a number of first measurement gaps is selected so as to complete the first cell measurement; and
second measurement gaps for performing a second cell measurement at a second frequency, wherein a number of second measurement gaps is selected so as to complete the second cell measurement;
wherein the number of second measurement gaps is not selected until after the first cell measurement is completed and the MGRPs are configured non-periodically for measurements on asynchronous neighboring cells;
wherein the apparatus is configured to perform both the first measurement and the second measurement within a same burst period on the different frequencies based on the IE, wherein the one or more MGRPs are within the same burst period and differ in duration based on a position where the first cell measurement is completed.

18. The apparatus of claim 17, wherein each of the plurality of measurement gaps comprises a duration of less than 6 milliseconds.

19. The apparatus of claim 17, wherein each of the plurality of measurement gaps comprises a duration of less than 2 milliseconds.

20. The apparatus of claim 17, further comprising:
radio frequency circuitry coupled between the plurality of antennas and the baseband circuitry.

21. The apparatus of claim 20, the radio frequency circuitry further comprising:
an automatic gain control;
wherein the automatic gain control is not adjusted between performing the first cell measurement and the second cell measurement.

22. The apparatus of claim 17, wherein the MGRPs are configured periodically for measurements on synchronous neighboring cells.

23. The apparatus of claim 17, wherein the measurement gaps are non-periodic and based on a unified MGRP with specified offsets.

24. An article comprising a non-transitory computer-readable medium comprising instructions to cause an electronic device, upon execution of instructions by one or more processors of the electronic device, to:
receive and transmit signals; and
receive a Radio Resource Control (RRC) reconfiguration message using baseband circuitry, the RRC reconfiguration message comprising an information element (IE) as a single IE;
wherein the IE comprises indications of measurement gap patterns associated with different frequencies, the measure gap patterns comprising a plurality of measurement gaps separated by measurement gap repetition periods (MGRPs) with different durations, wherein the plurality of measurement gaps comprises first measurement gaps, second measurement gaps, and third measurement gaps that are associated with the different frequencies, respectively, as indicated in the single IE received during an RRC connection reconfiguration to perform measurements on different cells corresponding to the first measurement gaps, the second measurement gaps, and the third measurement gaps at the different frequencies;
wherein the baseband circuitry is configured to perform both a first measurement and a second measurement on the different frequencies within a same burst period based on the IE, and the MGRPs are within the same burst period and differ in duration within the same burst period based on a position where the first cell measurement is completed.

* * * * *